United States Patent
Kutscher et al.

(10) Patent No.: US 9,258,388 B2
(45) Date of Patent: Feb. 9, 2016

(54) FRAMEWORK OF AN EFFICIENT CONGESTION EXPOSURE AUDIT FUNCTION

(75) Inventors: Dirk Kutscher, Heidelberg (DE); Faisal-Ghias Mir, Heidelberg (DE); Marcus Brunner, Leimen (DE)

(73) Assignee: NEC EUROPE LTD., Heidelberg (DE)

( * ) Notice: Subject to any disclaimer, the term of this patent is extended or adjusted under 35 U.S.C. 154(b) by 457 days.

(21) Appl. No.: 13/811,779

(22) PCT Filed: Sep. 7, 2011

(86) PCT No.: PCT/EP2011/004495
§ 371 (c)(1),
(2), (4) Date: Jan. 23, 2013

(87) PCT Pub. No.: WO2012/031746
PCT Pub. Date: Mar. 15, 2012

(65) Prior Publication Data
US 2013/0124754 A1 May 16, 2013

(30) Foreign Application Priority Data
Sep. 7, 2010 (EP) .................................. 10009298

(51) Int. Cl.
*G06F 15/16* (2006.01)
*H04L 29/06* (2006.01)
(Continued)

(52) U.S. Cl.
CPC ................ *H04L 69/02* (2013.01); *H04L 47/20* (2013.01); *H04L 47/31* (2013.01); *H04L 47/26* (2013.01); *H04L 47/32* (2013.01)

(58) Field of Classification Search
CPC ......... H04L 47/10; H04L 47/12; H04L 47/31; H04L 47/11; H04L 47/26; H04L 47/35; H04W 28/02; H04W 28/0289; H04W 28/10

USPC .......................................... 709/231–232, 235
See application file for complete search history.

(56) References Cited

U.S. PATENT DOCUMENTS 6,587,437 B1 *  7/2003  Lee et al. .................... 370/236.1
8,422,367 B2 *  4/2013  Chen ........................ H04L 47/10
                                                    370/229

(Continued)

OTHER PUBLICATIONS

Briscoe A. Jacquet T Moncaster A Smith BT B: "Re-ECN: Adding Accountability for Causing Congestion to TCP/IP; draft-briscoe-tsvwg-re-ecn-tcp-08.txt", Re-ECN: Adding Accountability for Causing Congestion to TCP/IP; draft-briscoe-tsvwg-re-ecn-tcp-08.txt, Internet Engineering Task Force, IETF; Standardworkingdraft, Internet Society (ISOC) 4, Rue Des Falaises CH-1205 Geneva, Switzerland, No. 8, Sep. 30, 2009, XP015064338, [retrieved on Sep. 30, 2009] see pp. 1-51.

(Continued)

*Primary Examiner* — Duyen Doan
(74) *Attorney, Agent, or Firm* — Young & Thompson (57) ABSTRACT

A method of operating a packet dropper in a congestion exposure-enabled network, wherein sending hosts and receiving hosts communicate with each other by sending flows of packets over network paths via intermediate routers, which, upon detecting congestion, mark packets of the flows as congestion packets, wherein congestion is indicated to the sending hosts by way of a congestion feedback mechanism, and wherein the sending hosts, upon receiving congestion indications, declare a subset of the packets they send as congestion response packets, thereby producing either conformant flows or non-conformant flows, depending on whether the amount of congestion response packets is balanced with the indicated congestion level or not, is characterized in that the packet dropper carries out in succession a series of traffic analyzing steps for identifying the non-conformant flows. Furthermore, a corresponding packet dropper for use in a congestion exposure-enabled network is described.

15 Claims, 5 Drawing Sheets

(51) Int. Cl.
  *H04L 12/813* (2013.01)
  *H04L 12/833* (2013.01)
  *H04L 12/825* (2013.01)
  *H04L 12/823* (2013.01)

(56) References Cited

U.S. PATENT DOCUMENTS

| | | | |
|---|---|---|---|
| 8,824,281 B2 * | 9/2014 | Ramakrishnan | H04L 43/0894 370/229 |
| 8,873,396 B2 * | 10/2014 | Tay | H04L 47/10 370/230 |
| 2009/0279433 A1 | 11/2009 | Briscoe et al. | |
| 2011/0211449 A1 * | 9/2011 | Attar | H04L 47/34 370/235 |
| 2012/0051216 A1 * | 3/2012 | Zhang et al. | 370/230 |
| 2012/0120798 A1 * | 5/2012 | Jacquet et al. | 370/230 |
| 2012/0147750 A1 * | 6/2012 | Pelletier | H04W 28/02 370/235 |

OTHER PUBLICATIONS

Briscoe Bob et al: "Policing Congestion Response in an Internetwork using Re-feedback", Proceedings of ACM SIGCOMM, XX, XX, Aug. 22, 2005, pp. 277-288, XP002450828, cited in the specification and ISR.

International Search Report, dated Dec. 23, 2011, from corresponding PCT application.

* cited by examiner

FRAMEWORK OF AN EFFICIENT CONGESTION EXPOSURE AUDIT FUNCTION

The present invention relates to a method of operating a packet dropper in a congestion exposure-enabled network, wherein sending hosts and receiving hosts communicate with each other by sending flows of packets over network paths via intermediate routers, which, upon detecting congestion, mark packets of said flows as congestion packets,
   wherein congestion is indicated to the sending hosts by means of a congestion feedback mechanism, and
   wherein the sending hosts, upon receiving congestion indications, declare a subset of the packets they send as congestion response packets, thereby producing either conformant flows or non-conformant flows, depending on whether the amount of congestion response packets is balanced with the indicated congestion level or not.

Furthermore, the present invention relates to a packet dropper for use in a congestion exposure-enabled network,
   wherein sending hosts and receiving hosts communicate with each other by sending flows of packets over network paths via intermediate routers, which, upon detecting congestion, mark packets of said flows as congestion packets,
   wherein a congestion feedback mechanism is provided being configured to indicate congestion to the sending hosts, and
   wherein the sending hosts, upon receiving congestion indications, declare a subset of the packets they send as congestion response packets, thereby producing either conformant flows or non-conformant flows, depending on whether the amount of congestion response packets is balanced with the indicated congestion level or not.

BACKGROUND OF THE INVENTION

Congestion-based network traffic policing based on congestion exposure is a promising network resource control paradigm that accounts for user traffic in the event of network congestion. It has been argued, for example in B. Briscoe, "Flow Rate Fairness Dismantling a Religion", ACM Computer Communications Review, 37(2), 63-74 (April 2007), that flow rate fairness, which has been used in the past, is not a reasonable mechanism for resource allocation and accountability of network resources. Instead, it is suggested that a cost-based mechanism would provide a better resource allocation paradigm, in which "cost" means the degree to which each user's transfers restrict other transfers, given the available network resources. The metric that has been suggested for measuring this cost is the volume of network congestion caused by each user. A network traffic policing mechanism based on congestion offers a net-neutral way for network operators to manage traffic on their networks.

There have been several proposals for implementing congestion-based network traffic policing. For example, Re-ECN (Relay or Re-feedback of Explicit Congestion Notification) is a proposal that has been made in the Internet Engineering Task Force (IETF) Congestion Exposure (CONEX) Working Group, being described, for example, in B. Briscoe, A. Jacquet, C. Di Cairano-Gilfedder, A. Salvatori, A. Soppera, and M. Koyabe, "Policing Congestion Response in an Internetwork using Re-feedback", Proc. ACM SIGCOMM'05, CCR, 35(4):277-288, August 2005. As will be discussed in greater detail below, Re-ECN, or re-feedback of explicit congestion notification provides a feedback mechanism through which packets expose the congestion that they expect to cause. The key feature is the user based accountability that is not based on resource usage but on the congestion user traffic is causing to others in a network.

Figure 1:
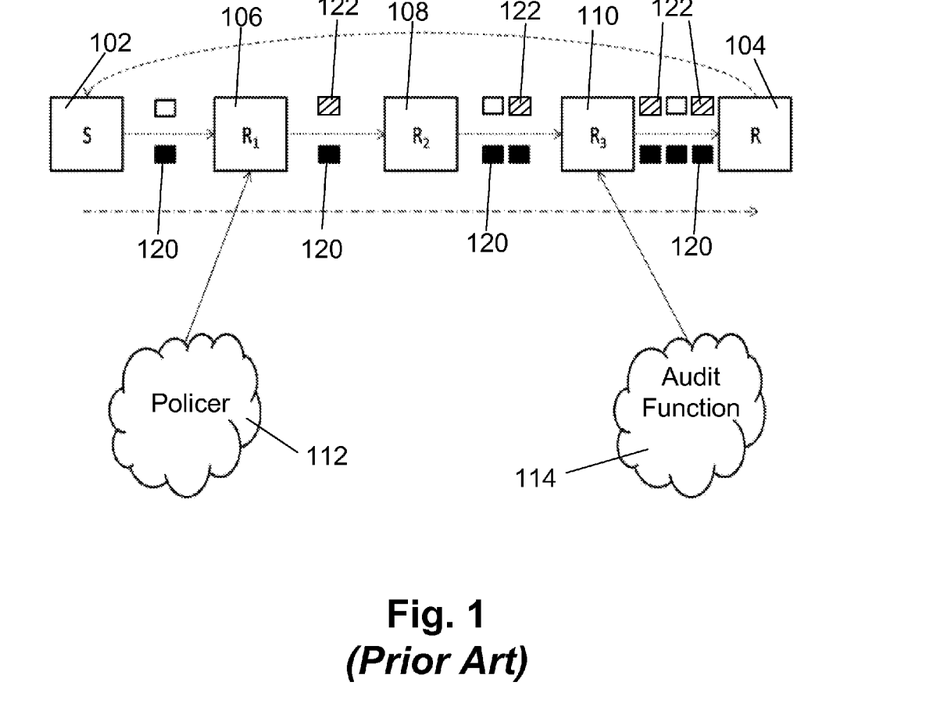
FIG. 1 shows an overview of a previously known Re-ECN framework.

For instance, in a Re-ECN system as shown in FIG. 1, which is a specific implementation of a congestion exposure system, there are different functional entities: routers detect congestion and apply Explicit Congestion Notification (ECN) to packets in their queue. Receiving endpoints collect this congestion information and relay it back to the sender. The sender runs a transport protocol (for instance TCP) and can use this information for the congestion control algorithm of a transport protocol. Also, the sender is expected to re-act to the received feedback declaring its contribution to congestion for subsequent packet transmissions. This is done by marking a certain fraction of packets appropriately. An operator-provided Policer can use this information to police or to account for traffic accordingly.

For measuring conformant congestion response, congestion exposure system normally rely on an audit function placed at the network egress. For instance, in Re-ECN the audit function is implemented in form of a packet dropper entity. Therefore, packet dropper and audit function are used as synonyms hereinafter. Based on the actual observed path congestion and based on the declared congestion contribution by sender, such an audit function/packet dropper can enforce the overall congestion-based policing by dropping packets pertaining to particular non-conformant flows.

Under congestion situations, for a given response there is an upper limit on the possible bit rate offered by the network. Naturally, users want to increase their bit rate (utility) by understating their congestion contribution in the network. Such a non-conformant behavior is termed as cheating because under the given network congestion it offers a higher bit rate, i.e. network-resources, than those users which are declaring congestion honestly, i.e. in a conformant fashion. Thus, although congestion exposure systems are a promising network resource control approach the problem remains that they require joint participation from end hosts and a network operator.

Collectively, the path congestion and its response can best be estimated at the network egress. The challenge remains that the cheating users are hidden in the overall traffic aggregate. By varying the response, users can devise rich set of cheating patterns that a network must identify and penalize. Since the congestion declaration is under the full control of the sending host, an operator must monitor user response to the network congestion for fair resource accountability among the competing hosts.

SUMMARY OF THE INVENTION

In view of the above, it is an object of the present invention to improve and further develop a method of operating a packet dropper and a packet dropper of the initially described type in such a way that, by employing mechanisms that are readily to implement, an accurate and reliable detection of cheating users is enabled.

In accordance with the invention, the aforementioned object is accomplished by a method comprising the features of claim 1. According to this claim such a method is characterized in that said packet dropper carries out in succession a series of traffic analyzing steps for identifying said non-conformant flows.

Furthermore, the aforementioned object is accomplished by a packet dropper comprising the features of independent claim 11. According to this claim, such a packet dropper is characterized in that it comprises a plurality of traffic analyzing modules being employed in succession for identifying said non-conformant flows.

According to the present invention it has been recognized that an accurate and reliable detection, isolation and, as the case may be, penalization of various cheating patterns used by sending hosts can be realized by a step-wise approach for identifying non-conformant flows hidden in the overall aggregate. The proposed framework checks for non-conformity in a series of steps before classifying a subset of flows as cheating. That is, in contrast to prior art solutions, which try to split a given set of flow identifiers into two subset of identifiers with the impact to separate the conformant and non-conformant traffic based on some control condition (as described, for instance, in US 2009/0279433 A1), the method and the packet dropper according to the present invention do not explicitly separate conformant and non-conformant flows. Instead, a plurality of traffic analyzing modules are employed in succession for identifying said non-conformant flows, wherein—starting from a super set of all flow identifiers—only the non-conformant flows are kept from in the analyzing modules from step to step, while the conformant ones are discarded.

As a result, the present invention provides a general congestion exposure audit function framework for efficiently isolating and penalizing cheating traffic. By applying the invention better resource accountability in situations of network congestion can be achieved. Further, fair resource usage for users that are conformant in declaring their contribution to congestion can be enforced. With respect to operational issues, the present invention comes along with the advantage that due to the step-wise approach it is possible to realize an on demand detection operation, in which the detection algorithm is turned on only in situations where there is sufficient evidence that the path is dominantly occupied by the cheating users.

According to one embodiment an initial step from the series of traffic analyzing steps includes monitoring the overall traffic aggregate at network egress and aggregating congestion marked packets and congestion response packets for the overall traffic aggregate. To this end, an aggregator monitoring module may be implemented that establishes the notion of non-conformity for the overall traffic aggregate by only aggregating information on the congestion and response packets.

Advantageously, it may be provided that subsequent steps from the series of steps are triggered in case the running difference between congestion marked packets and congestion response packets exceeds a predefined threshold. Thus, a sort of a hybrid audit function implementation would be realized, which maintains the overall trend at the path egress by aggregating congestion and response packets for the overall traffic aggregate. Based on these two mean values, i.e. of the congestion marked packets on the one hand and the congestion response packets on the other hand, the aggregator monitoring module maintains the net deficit the respective link is experiencing at the egress. The predefined "cut-off" threshold maintained by the aggregator monitoring module signifies that the running delta for the link is under acceptable deviation from the ideal zero mean value. Once the delta value exceeds the "cut-off" threshold the aggregator monitoring module should trigger the state management at the egress.

With respect to realizing a light weight stateless packet dropper implementation it may be provided that in a first step of the subsequent steps a dropping probability for packets on the basis of the running difference is being calculated. Alternatively, in a more sophisticated stateful implementation it may be provided that in a first step of the subsequent steps a subset of flows is being identified from the overall traffic aggregate, which include packets having recently been marked as congestion packets. To this end, the packet dropper may include a recent situation analysis module. Since congestion is time varying, this module may be configured to track changes in user response by relating this information to network path congestion.

According to a further preferred embodiment, a second step of the subsequent steps includes observing for a shorter duration of time for each element of the subset of flows determined in the first step the difference between congestion marked packets and congestion response packets. To this end, the packet dropper may include a cheaters detection module that is configured to detect whether a subset of traffic from the overall traffic aggregate is indeed cheating. Since non-conformity could be due to any conceivable cheating pattern, this module monitors for displaced mean only for a shorter duration of time for each element of the subset that have been identified in the previously executed step. The metric for this module is the difference between congestion marked and congestion response data volumes, hereinafter briefly denoted "delta". The value of this difference may be observed for a fixed number of "N" samples or on a time unit based observation independent of the number of samples arrived in that period. The conformant flow identifiers are discarded in this step while non-conformant ones are kept in this module.

According to a still further preferred embodiment, a third step of the subsequent steps includes imposing drop operations on those flows for which the second step analysis yields a difference between the congestion marked packets and the congestion response packets that exceeds a predefined threshold. To this end, the subset of flow identifiers having been identified as non-conformant by the cheaters detection module may be passed on to a detailed flow analysis module for imposing the drop operations. The metric for this module is to accumulate deficit over some time unit for non-conformant traffic and drops should increase with increased deviation. The component should be self-controlled such that it should keep the subset traffic under observation only if drops are persistent. If at some later time it is found that traffic is conformant then that instance should automatically be reduced.

Furthermore, for the subset of traffic that is detected as cheating, specific audit function instances are spawned for precisely enforcing packet drops. Through a drop behavior component, various dropping policies and implementations can be defined. This component may be kept independent to have different penalizing behaviors. The drop probabilities may be modeled based on currently accumulated deficit as discussed above. Only subset of flows identified in the previously executed step may receive drop operations based on some criteria.

BRIEF DESCRIPTION OF THE DRAWINGS

There are several ways how to design and further develop the teaching of the present invention in an advantageous way. To this end, it is to be referred to the patent claims subordinate to patent claims 1 and 11 and to the following explanation of preferred examples of embodiments of the invention, illustrated by the figures. In connection with the explanation of the preferred examples of embodiments of the invention by the aid of the figures, generally preferred embodiments and further developments of the teaching will be explained. In the drawings

DESCRIPTION OF PREFERRED EMBODIMENTS

Congestion-based policing of network traffic provides a useful mechanism for allocating and accounting for network resources in a manner that is based on "cost-fairness". While there have been previous attempts to provide methods and systems for congestion-based policing of network traffic, these previous attempts have some issues that could prevent them from being widely used.

FIG. 1 shows an overview of the Re-ECN (which stands for re-feedback of explicit congestion notification) framework, and its functional entities. Re-ECN is described, for example, in B. Briscoe, A. Jacquet, C. Di Cairano-Gilfedder, A. Salvatori, A. Soppera, and M. Koyabe, "Policing congestion response in an internetwork using re-feedback", Proc. ACM SIGCOMM'05, CCR, 35(4):277-288, August 2005.

As shown in FIG. 1, a sender 102 (e.g., a TCP sender) and a receiver 104 (e.g., a TCP receiver) communicate over a path that includes routers 106, 108, and 110, as well as a policer 112 and an audit function 114. For the sender 102 and the receiver 104, the path can exhibit different characteristics with respect to delay, packet loss or "Congestion Experienced" (CE) marking rate due to transient or persistent congestion. Routers, such as the routers 106, 108, and 110, implementing active queue management (AQM) mechanisms probabilistically set the explicit congestion notification (ECN) bits (using random early detection (RED)) in the IP packets, such as packets 122 indicated by the shaded rectangles, when they detect persistent congestion. The receiver 104, upon receiving congestion marked packets, such as the packets 122, notifies the sender about the current congestion level through its transport protocol's feedback mechanism, e.g., using TCP header fields. The sender 102 then reacts to received congestion indications by adapting the sending rate according to the congestion control mechanisms of the specific transport protocol, and by declaring a fraction of the IP traffic sent on this connection as its congestion contribution to the network, by placing re-echo information in packets sent, such as congestion response packets 120 indicated by the filled rectangles, with the goal of balancing the number of "negative" bytes, i.e. the congestion contribution as reported by congestion feedback, with the number of "positive" bytes, i.e. the congestion contribution response as declared by the sender.

Thus, the basic principle of Re-ECN is to re-insert information on the experienced congestion back into the network. This allows an ingress policer 112 to decide what a user is entitled to in terms of allowed congestion according to network policies. In contrast, an audit function 114, which is implemented as packet dropper, validates what is being declared in correct or not and, as the case may be, drops packets in flows that persistently declare negative downstream congestion (i.e., that under-declare their congestion contribution).

Operators may choose to place the policer 112 at the network ingress, e.g., for rate-limiting the congestion that a user is allowed to cause in a given time period or for applying certain accounting schemes. Once a pre-configured quota is consumed, certain types of penalties are possible, e.g. imposing a decrease in service rate. It should be noted that the ingress policer 112 only rate limits the declared congestion. Therefore, there is still a possibility that understating the congestion may lead to a higher bit rate corresponding to an increase in utility. For the honest users, the response and congestion fractions should cancel out each other at the egress. It is not true for the users that are understating the congestion and their traffic eventually experiences a net deficit at the egress. Therefore, the packet dropper or audit function has been proposed to be the last entity in the path for penalizing the cheating flows.

Figure 2:
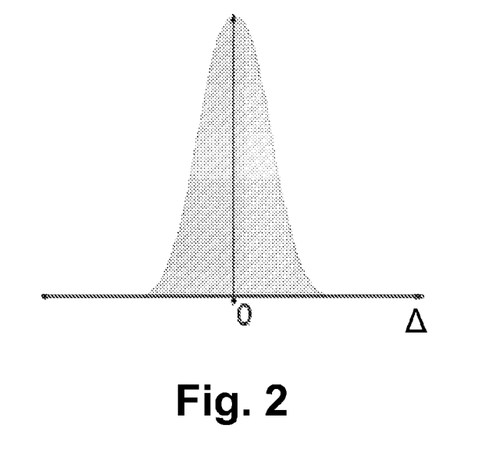
FIG. 2 shows a distribution of the mean of the difference between marked congestion and its response according to a dominant user strategy.
Figure 3:
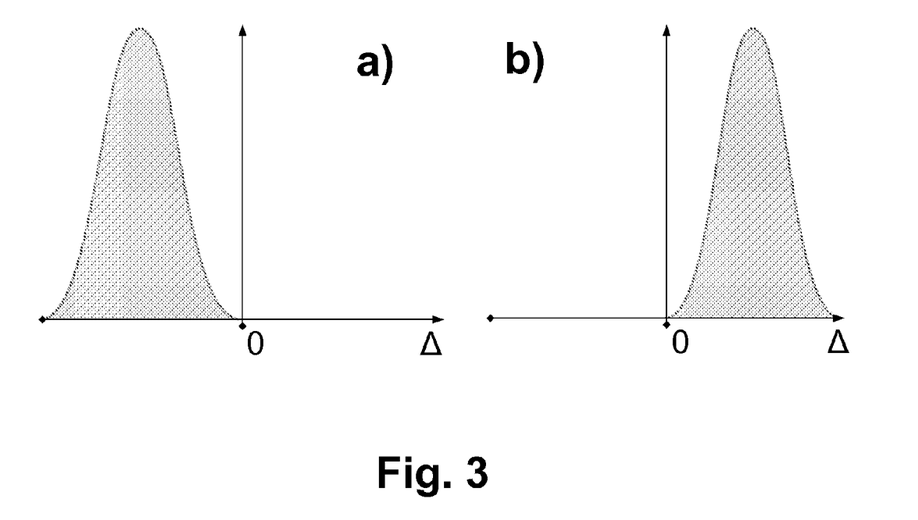
FIG. 3 shows a distribution of the displaced mean for understating (left) and overstating (right) congestion.

Referring now to FIGS. 2 and 3, the above mentioned cheating mechanism will be described in some more detail. Generally, it should be noted in this regard that the path state, i.e. congestion, changes in proportion to the offered load. In turn, this will cause variations in the congestion marking rate at the intermediate routers implementing advanced AQM (Active Queue Management) mechanisms, as described, e.g., in Sally Floyd and Van Jacobson: "Random early detection gateways for congestion avoidance", IEEE Transactions on Networking, Vol. 1, No. 4, August 1993. For adjusting the response it takes at least a single RTT (Round Trip Time) for the changes to become visible at the sending host through the feedback loop. The forward path contains changes from the last feedback cycle and the path state can still have new variations, therefore it is quite likely to have a running difference between the number of congestion marked packets and the corresponding congestion response packets leaving the network.

If the running mean of congestion and its response packets (or, more precisely, the running mean of the difference between the number of congestion marked packets and congestion response packets) is maintained at the path egress then most of the samples should have a difference—delta—close to the zero mean value. In that case the normal distribution as shown in FIG. 2 could be used for approximating the average deviation from the zero mean value. For a Re-ECN compliant sender deviations from the zero mean value could possibly be due to factors like changes in average delay, variations in the marking rate, mean packet size used by the transport protocol, packet re-arrangement or losses along the path.

In contrast, a persistent negative delta signifies persistent cheating behavior, i.e. the existence of sending hosts understating their congestion contribution in the network, whereas a persistent positive delta shows over reaction to congestion. It is the negative delta that an audit function is interested in measuring because overstatement is already rate limited at the network ingress by the ingress policer 112. The two cases for average deviations are illustrated in FIG. 3, with a persistent negative delta being shown in FIG. 3a and a persistent positive delta being shown in FIG. 3a.

Generally, the cheating behavior can be defined as the deviation from the dominant user strategy: either positive or negative, as described in connection with FIG. 3. However, it is the negative deviation only, shown in FIG. 3a, and its analysis and measurement at the path egress that is targeted by the present invention, since congestion overstatement (coming along with positive deltas as shown in FIG. 3b) implies a net decrease in user utility imposed by the ingress policer 112. The subtle distinction is to differentiate the negative deviations due to changes in the path characteristics from the one that are explicitly introduced by sending hosts. Without careful analysis, an honest flow can possibly look like a dishonest flow at the path egress.

One way of modeling cheating would be to manipulate the ratio of the data volume being congestion marked and the data volume of its response at the sender, which can be defined as the cheat ratio. For a given ratio, only a certain degree of response is possible for analyzing the mean value at the path egress.

Figure 4:
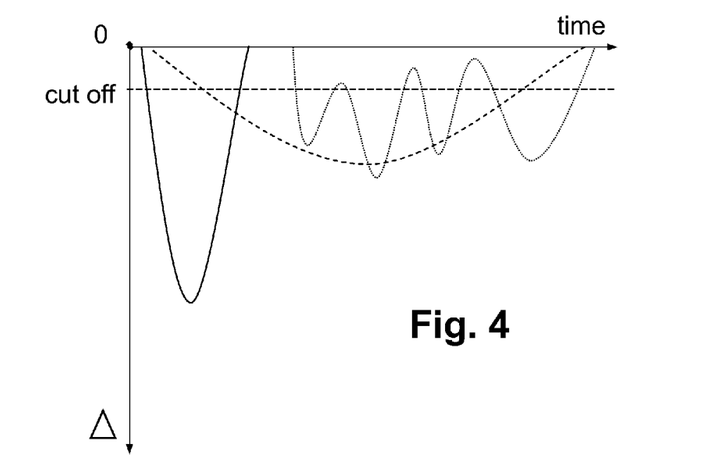
FIG. 4 shows different cheating patterns for three users.

Further, a cheat cycle can be defined, which combines the cheat ratio with the length of time over which a sender is understating the path congestion. Given the cheat cycle, it is possible to define new cheating behaviors and measure the deviations at the path egress. One approach would be to have a shorter cheat cycle but with higher degree of cheating, wherein such pattern could be repeated for fixed or variable time intervals. In contrast, one could achieve a similar effect by increasing the length of the cheat cycle but with a lower degree of cheating, i.e. cheat ratio. Such a rich set of behaviors offers different scenarios for analyzing the audit function or packet dropper reaction time and penalizing behavior. FIG. 4 shows three different cheating patterns. The solid line curve shows higher cheat ratio for a shorter time period whereas the dashed line curve shows a longer cheat pattern but with lower cheat ratio. Lastly, the dotted line curve shows a random behavior over a time period. The cutoff threshold is conceptually shown for contrasting the cheating and non-cheating regions as observed at the egress. To summarize, it should be noted that at egress the cheating behavior can be classified on the dimensions cheat ratio, length of a cheat cycle and, additionally, the population of cheating users in overall traffic aggregate.

Figure 5:
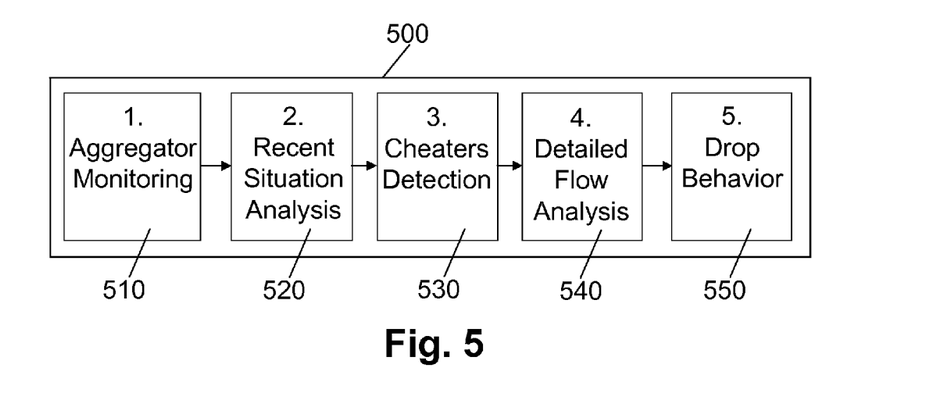
FIG. 5 shows a packet dropper framework in accordance with an embodiment of the present invention.

FIG. 5 schematically illustrates the framework of a packet dropper/audit function 500 in accordance with an embodiment of the present invention. The illustrated embodiment includes a total of five components, which are traffic analyzing modules that are employed in succession for identifying/detecting and penalizing the non-conformant (cheating) user traffic. It is important to note that each of the components may implement its own algorithm and by using different components or combinations of different components, various audit function implementations can be conceived.

In the following, the individual components of the packet dropper 500 of FIG. 5, their basic functionalities and the way these components work together for verifying the time varying non-conformity in congestion response of users are described in some more detail. As will be apparent to a skilled person, each of the components can have other than the specifically described algorithms or implementations, which achieve similar effects as the ones described hereinafter.

Aggregate Monitoring Module 510—Step 1

The Aggregate Monitoring Module 510 has the responsibility of mapping the path characteristics in terms of measuring the amount of non-conformity (i.e. the size of the delta discussed in connection with FIGS. 2-4) currently monitored for the overall traffic aggregate at egress. The motivation is due to the fact that, at any time instant the overall-aggregate at egress may compose of both conformant and non-conformant user traffic and it signifies the severity of non-conformity. The Aggregate Monitoring Module 510 performs a first traffic analyzing step from a potential plurality of traffic analyzing steps by only monitoring the aggregate traffic. Based on this measurement other components of the audit function can be triggered to perform successive traffic analyzing steps. Since the Aggregate Monitoring Module 510 is monitoring all traffic, in terms of flow identifiers it is looking at the super set of all identifiers at any time instant. Further details of the functionality of the Aggregate Monitoring Module 510 will be described below in connection with FIG. 6.

Recent Situation Analysis Module 520—Step 2

If the Aggregate Monitoring Module 510 signals some significant changes in the deviations of the delta between congestion and its response packets from the zero mean value for a time unit, then the Aggregate Monitoring Module 510 may be used as a stimulus for triggering the Recent Situation Analysis Module 520. This module aims at identifying a subset of flow identifiers from the super set of all flow identifiers (overall aggregate) that belong to those flows which contain packets that recently either received congestion markings or in which congestion response markings have been recently inserted. These packets correspond to the shaded packets 122 and to the filled packets 120 of FIG. 1, respectively. The metric for the Recent Situation Analysis Module 520 is the congestion or response packets in congestion exposure-enabled network. The motivation is due to the observation that changes in deviations are due to flows that have recently received marked packets, and possibly among this subset of flows are the ones that are non-conformant in their congestion response. It should be noted that the size of a subset can possibly be smaller than or equal to the size of the super set of flows analyzed in step 1 by the Aggregate Monitoring Module 510.

Cheaters Detection Module 530—Step 3

The subset of flows identified in step 2 by the Recent Situation Analysis Module 520 is passed on to the Cheaters Detection Module 530 for determining again a subset of flows that are indeed non-conformant. Since non-conformity could be due to any conceivable cheating patterns as discussed in connection with FIG. 4, the Cheaters Detection Module 530 monitors for displaced mean only for a shorter duration of time for each element of the subset that has been identified in step 2 the Cheaters Detection Module 530. The metric for this module is the delta described in connection with FIGS. 2-4, which describes the difference between the data volume of congestion marked packets and the data volume of congestion response packets. The Cheaters Detection Module 530 may be configured to measure the delta either by observing a predefined number of "N" samples or by performing a time unit based observation independent of the number of samples arriving in that period. In case the resulting delta falls below a predefined cut off threshold (as shown in FIG. 4) the corresponding flows are qualified as conformant flows and the corresponding flow identifiers are discarded in this step. On the other hand, In case the resulting exceeds the predefined cut off threshold, the corresponding flows are qualified as non-conformant flows, which are kept in the module for further analysis. An embodiment of a preferred implementation of the Cheaters Detection Module 530 is described in more detail below in connection with FIG. 7.

Detailed Flow Analysis Module 540—Step 4

The subset of flow identifiers that have been identified as non-conformant in step 3 by the Cheaters Detection Module 530 are passed on to the Detailed Flow Analysis Module 540 for imposing drop operations. The metric for this module is to accumulate deficit over some time unit for non-conformant traffic. Packet drops should increase with increased deviation. The Detailed Flow Analysis Module 540 should be self-controlled such that it should keep the subset traffic under observation only if drops are persistent. If at some later time it is found that traffic is conformant, then that instance should automatically be reduced.

Drop Behavior Module 550—Step 5

The Drop Behavior Module 550 is kept independent to have different penalizing behaviors. The drop probabilities may be modeled based on currently accumulated deficit as discussed in step 4. Only the subset of flows identified in step 4 may receive drop operations based on some criteria.

It is important to note that the implementation described above is only one possibility of realizing a packet dropper in accordance with the present invention and that many other specific implementations can be envisioned. For instance, for a light weight stateless, i.e. not flow specific, packet dropper implementation only two components would be required: the Aggregate Monitoring Module 510 and the Drop Behavior Module 550. The Aggregate Monitoring Module 510 may only aggregate and maintain the congestion and its response history. Based on the running difference, a dropping probability could then be calculated by the Drop Behavior Module 550. For example, such implementation proves to be advantageous for deployment in wireless networks with only a small number of subscribers and a comparatively small number of flows.

In contrast, for a hybrid implementation two more components would have to be implemented: the Recent Situation Analysis Module 520 and the Detailed Flow Analysis Module 540. The Recent Situation Analysis Module 520 is required for filtering out the cheating flows in the overall aggregate. Further, for the detailed analysis active audit function instances must be maintained.

Figure 6:
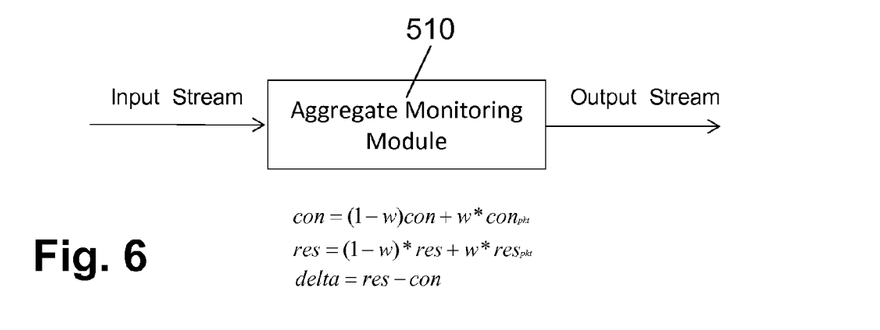
FIG. 6 shows an implementation of an aggregate monitoring module in accordance with an embodiment of the present invention.

FIG. 6 schematically illustrates an implementation of an Aggregate Monitoring Module 510 in accordance with an embodiment of the present invention. The general approach is to maintain the overall trend at the path egress by aggregating congestion marked packets and congestion response packets for the overall traffic aggregate. To this end, as shown in FIG. 6, the Aggregate Monitoring Module 510 receives as input stream the overall traffic aggregate at network egress, i.e. a super set of all flows. From this aggregate the Aggregate Monitoring Module 510 determines those flows which contain congestion marked packets, i.e. packets marked by the intermediate routers with ECN (Explicit Congestion Notification) bits set, as well as those flows which contain congestion response packets, i.e. packets marked by the user to declare its contribution to congestion.

The Aggregate Monitoring Module 510 maintains running averages of the two streams mentioned above, which in FIG. 6 are denoted as "con" (=running average of aggregated congestion marked packets) and "res" (=running average of aggregated congestion response packets). In the formula of FIG. 6, the variable w denotes an implementation specific weight factor to the measured congestion history that accounts for an efficient update of the running averages. The variable $con_{pkt}$ denotes the latest arrived congestion packet at egress, i.e. the sample through which the average congestion, i.e. the "con"-value, is updated. Correspondingly, the variable $res_{pkt}$ denotes the latest arrived response packet at egress, i.e. the sample through which the average response, i.e. the "res"-value, is updated. In both cases, the size in bytes of the latest packet is taken into account for calculating the updated averages.

Based on the two mean values, the Aggregate Monitoring Module 510 maintains the net deficit "delta" the respective link is experiencing at the egress. A "cut_off" threshold (see for ref. FIG. 4) is maintained by the Aggregate Monitoring Module 510, which signifies that the running delta for the link is under acceptable deviation from the ideal zero mean value. Once the delta value exceeds the "cut_off" threshold the Aggregate Monitoring Module 510 triggers the state management at the egress. To this end, in one embodiment of the present invention the output stream containing the two streams "con" and "res" including the potentially non-conformant flow identifiers is handed over to the Recent Situation Analysis Module 520 for further inspection.

Figure 7:
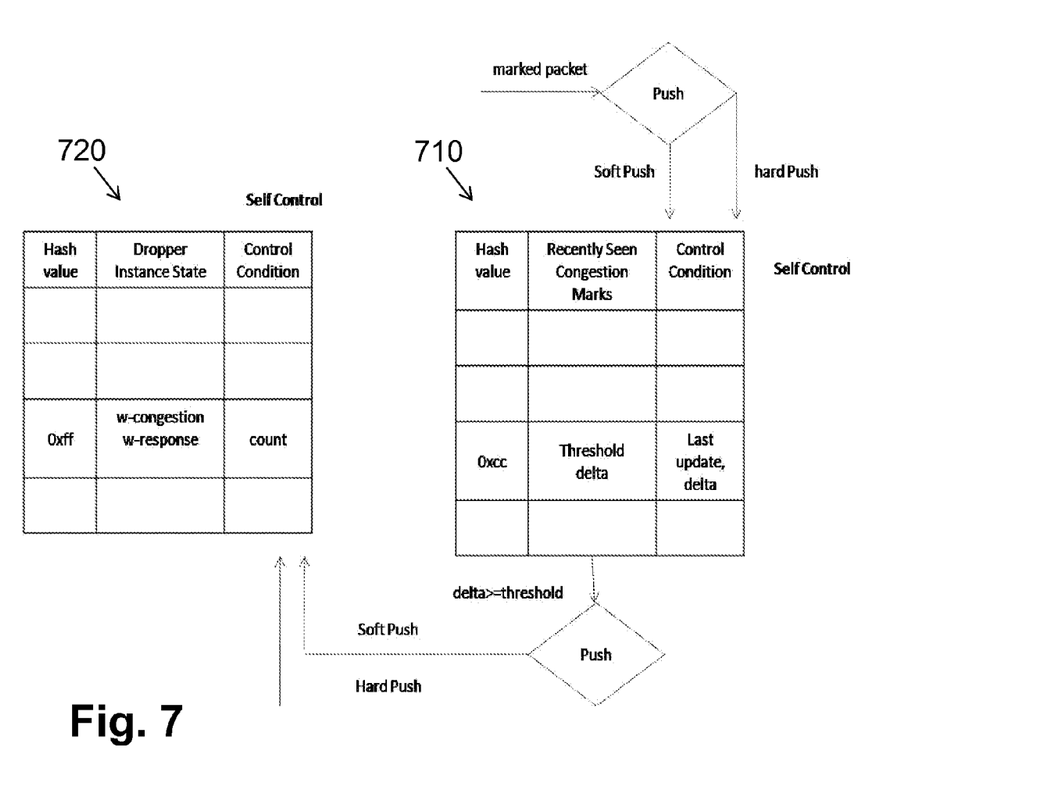
FIG. 7 illustrates the state management through concurrent traffic analyzing modules of a packet dropper according to an embodiment of the present invention.

FIG. 7 is a diagram that illustrates the state management through concurrent audit function instances of a packet dropper according to an embodiment of the present invention. For identifying the dishonest flows from the congestion aggregate a two phase process is employed in the audit function/packet dropper implementation: filtering and observation. During the filtering phase, which in one embodiment is performed by the Aggregate Monitoring Module 510 and by the Recent Situation Analysis Module 520 as described above, flows experiencing congestion are separated from the congestion aggregate for close analysis. The successive observation phase, which in one embodiment is performed by the Cheaters Detection Module 530 and the Detailed Flow Analysis Module 540, will be described hereinafter with reference to FIG. 7.

In the observation phase the flows isolated in the filtering phase are analyzed in more detail in order to determine the cheating/dishonest flows that understate their actual congestion contribution. For this purpose, the Cheaters Detection Module 530 maintains a Recent Marks Table 710 that is shown in the right part of FIG. 7. The Recent Marks Table 710 is fed by the Recent Situation Analysis Module 520 and receives from this module those flows that have been identified to contain marked packets. The flows are entered into the Recent Marks Table 710 either by a soft push or by a hard push. A soft push will be carried out in case the required space for the entry is already available in the table, i.e. nothing special needs to be done.

On the other hand, if the table is already full, i.e. a type of memory constraint being caused, for instance, by malicious users that try to exhaust dropper state management, a hard push will be carried out. In such case, the control condition associated with each table entry is used to see which flow entry seems most likely to be replaced by the newly arriving flow that "must" be put in the Recent Marks Table 710. For example, if a number of "N" samples are monitored against a threshold value and say a number of N−2 samples have already been monitored, then this flow can be taken out of the table to make room for a newly arriving flow. Through the control condition, it is possible to "sort" flows in the table on any criteria that is needed. Eventually, Hard-Push uses this control condition to alleviate memory constraints and make room for newly arriving traffic. Since it can be argued that a non-conformant flow may also be replaced, it is tried to minimize it by explicitly ranking traffic in terms of non-conformity in the Recent Marks Table 710.

In the embodiment of FIG. 7, the Recent Marks Table 710 has three entries: hash value, recent state and a control condition. The hash value is calculated on the flow parameters that can be obtained from the IP header: source address, source port, destination address, destination port and transport. The recent state contains a fixed implementation-specific threshold and the calculated delta, i.e. the running deficit for a given entry. In case the calculated delta exceeds the specified threshold, the respective entry is pushed to the Observation Table 720, which will be explained in more detail below.

Due to fixed size of the Recent Marks Table 710, each entry in the table has an associated control condition that implicitly defines the time duration for which the entry could possibly be retained in the table. It is the maximum allowed time for detecting a cheating pattern and hence classifying the flow as cheating. Further, the duration combined with the threshold defines the sensitivity to various cheating behaviors.

Based on the triggering behavior of the preceding module, which is the Recent Situation Analysis Module 520, the control condition of the Cheaters Detection Module 530 is classified as the Self control and Push operation. For the Self Control any entry is removed itself, whereas for push operation the Recent Situation Analysis Module 520 adds or removes entries from/to the Recent Marks Table 710. A possible control condition is to observe only for the last "n" congestion samples and if the deficit is not negative beyond a threshold the entry can be taken out from the table.

Similarly, if the Recent Marks Table 710 has identified a flow as potential cheater then the entry is removed from the Recent Table 710 and the state is transparently passed to the Observation Table 720, which is shown in the left part of FIG. 7. The Observation Table 720 is maintained by the Detailed Flow Analysis Module 540, and here an actual instance of the audit function is initiated for carefully analyzing and enforcing the drop operation. The Observation Table 720 maintains the EWMA (exponentially weighted moving average) of recent congestion history and the control condition for deciding the length of time the flow can possibly remain in the table. The Observation Table 720 also has the Self control and Push operations defined for each entry. The traffic belonging to the Observation Table 720 is transparently passed to the corresponding audit function instances by the Aggregator Monitoring Module 510. It is important to note here that only the Recent Marks Table 710 can trigger the Push Operation on the Observation Table 720. The Recent Marks Table 710 may be implemented as a fast cache that keeps recently seen marked packets state and once the control condition is satisfied, they are pushed into the Observation Table 720. A possible control condition for the Observation Table 720 is to maintain packet count between the successive drop operations. An honest flow that has been falsely identified as a dishonest one would have a low drop frequency. In contrast it is highly likely for a dishonest flow to maintain a higher drop frequency most of the times.

Figure 8:
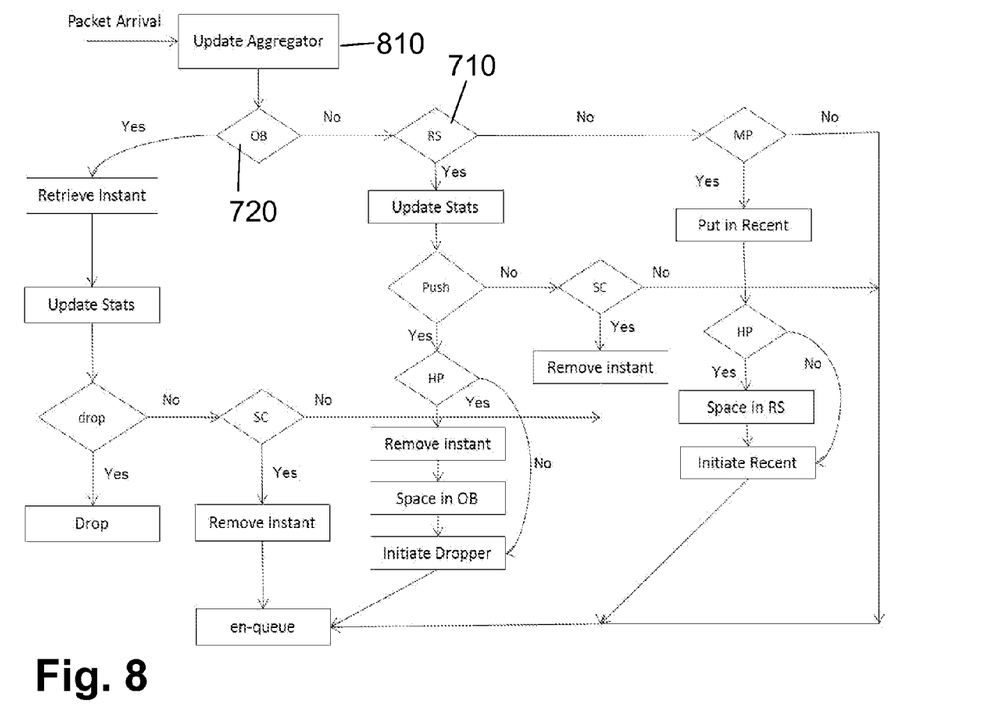
FIG. 8 illustrates a control loop for a packet dropper implementation in accordance with an embodiment of the present invention.

FIG. 8 is a diagram that illustrates a control loop for a packet dropper implementation in accordance with an embodiment of the present invention. In the diagram the following abbreviations are employed: OB=Observation Table 720, RS=Recent Marks Table 710, MP=Marked Packets, SC=Self Control, HP=Hard Push.

Each marked packet updates a Congestion Aggregator 810, and the implementation strives to minimize the accumulated deficit along the link. The Congestion Aggregator 810 splits the traffic between the Observation Table 720 and the Recent Marks Table 710 depending upon the current location of the flow in the tables. In case an arriving packet is part of a flow that is already contained in the Observation Table 720 of the Detailed Flow Analysis Module 540, the respective instant is retrieved, the respective states are updated (i.e. the current value of delta is stored), and drop operations are imposed. This means that the packet is either dropped, in case certain predefined criteria are fulfilled, or subjected to a self control. If the self control condition is satisfied, the respective instant is removed and the packet gets assigned the status en-queue, i.e. the packet will be forwarded to the receiving host. If the control condition is not satisfied, the packet will be forwarded to the receiving host without removing the respective instant from the Observation Table 720.

In contrast, in case the flow of an arriving packet is not yet contained in the Observation Table 720, a check is performed whether it is already contained in Recent Marks Table 720 of the Cheaters Detection Module 530. If so, the respective states are updated and a push operation is initiated. In case the updated state contains a delta exceeding the specified threshold, i.e. the respective flow has been identified as potential cheater, then the entry is passed to the Observation Table 720, with the entry either being removed from the Recent Marks Table 710 (in case of a hard push) or being kept.

Finally, in case the flow of an arriving packet is neither contained in the Observation Table 720 nor in the Recent Marks Table 710, a check is performed whether it is a marked packet (congestion or response). If so, the flow is entered into Recent Marks Table 710 packet, if not, the packet is prepared for being transmitted to the intended receiving host.

Generally, it is important to note that packet drops are only enforced to the flows that are carefully monitored by the concurrent audit function/packet drop instances.

Figure 9:
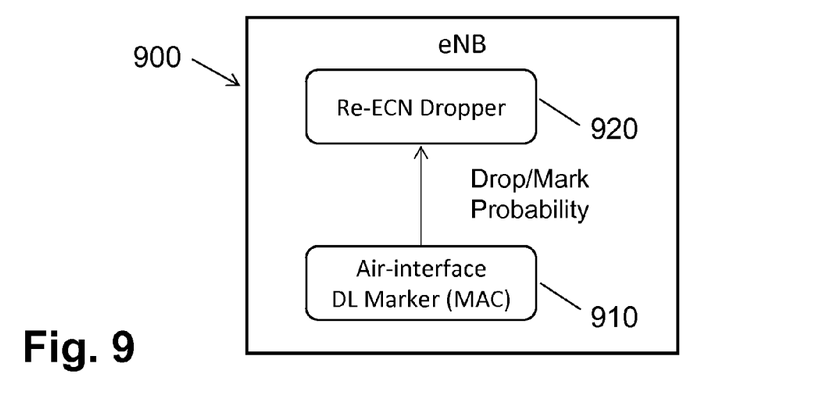
FIG. 9 shows an implementation of a packet dropper with a wireless base station DL (MAC) marker.

FIG. 9 illustrates an embodiment of the present invention for application in wireless networks, according to which the air interface (MAC layer) congestion is captured by a marker entity 910 at a wireless base station, e.g., an eNodeB 900 in LTE. For verifying and penalizing non-conformity, i.e. cheating behavior, a cross layer information exchange is enabled between the audit function entity, which in the illustrated embodiment is a Re-ECN Dropper 920 and the current Drop/Mark probability measured at the air interface. With this approach non-conformity (cheating) takes into account the current congestion at the air interface as shown in FIG. 9.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of operating a packet dropper in a congestion exposure-enabled network, comprising:

sending hosts and receiving hosts communicating with each other by sending flows of packets over network paths via intermediate routers, which, upon detecting congestion, mark packets of said flows as congestion packets;

indicating congestion to the sending hosts with a congestion feedback mechanism;

the sending hosts, upon receiving a congestion indication, declaring a subset of the packets they send as congestion response packets that produce either conformant flows or non-conformant flows, depending on whether the amount of congestion response packets is balanced with the indicated congestion level; and said packet dropper carrying out in succession a series of traffic analyzing steps for identifying said non-conformant flows, an initial step of said series of traffic analyzing steps including monitoring an overall traffic aggregate at network egress and aggregating said congestion marked packets and said congestion response packets for said overall traffic aggregate, and subsequent steps of said series of traffic analyzing steps being triggered when a running difference between said congestion marked packets and said congestion response packets exceeds a predefined threshold.

2. The method according to claim 1, wherein a first step of said subsequent steps of said series of traffic analyzing steps includes calculating a dropping probability for packets on the basis of said running difference.

3. The method according to claim 1, wherein a first step of said subsequent steps of said series of traffic analyzing steps includes identifying a subset of flows from said overall traffic aggregate, which include packets having recently been marked as congestion packets.

4. The method according to claim 3, wherein a second step of said subsequent steps of said series of traffic analyzing steps includes observing for a shorter duration of time for each element of the subset of flows determined in said first step the difference between said congestion marked packets and said congestion response packets.

5. The method according to claim 4, wherein the observing step is carried out for a predefined number of sample packets.

6. The method according to claim 4, wherein the observing step is carried out for all packets arriving within a predefined period of time.

7. The method according to claim 4, wherein a third step of said subsequent steps of said series of traffic analyzing steps includes imposing drop operations on those flows for which said second step analysis yields a difference between said congestion marked packets and said congestion response packets that exceeds a predefined threshold.

8. The method according to claim 7, wherein the number of packet drops is increased with increasing difference between said congestion marked packets and said congestion response packets accumulated over a predefined period of time.

9. A packet dropper for a congestion exposure-enabled network, that includes sending hosts and receiving hosts that communicate with each other by sending flows of packets over network paths via intermediate routers that are configured to, upon detecting congestion, mark packets the flows as congestion packets, and a congestion feedback mechanism that is configured to indicate congestion to the sending hosts, wherein the sending hosts are configured to, upon receiving a congestion indication indications, declare a subset of the packets they send as congestion response packets that produce either conformant flows or non-conformant flows, depending on whether the amount of congestion response packets is balanced with the indicated congestion level or not, said packet dropper comprising:

a memory, a processor, a plurality of traffic analyzing modules configured to be employed in succession to identify the non-conformant flows, said traffic analyzing modules including an aggregate monitoring module configured to monitor the overall traffic aggregate at network egress and to aggregate said congestion marked packets and said congestion response packets for said overall traffic aggregate, and said aggregate monitoring module being configured to trigger a subsequent module from said plurality of traffic analyzing modules when a running difference between said congestion marked packets and said congestion response packets exceeds a predefined threshold.

10. The packet dropper according to claim 9, wherein said traffic analyzing modules include a recent situation analysis module configured to identify from said overall traffic aggregate a subset of flows, which include packets having recently been marked as congestion packets.

11. The packet dropper according to claim 10, wherein said traffic analyzing modules include a cheaters detection module configured to observe for a shorter duration of time for each element of the subset of flows identified by said recent situation analysis module the difference between said congestion marked packets and said congestion response packets.

12. The packet dropper according to claim 11, wherein said traffic analyzing modules include a detailed flow analysis module configured to impose drop operations on those flows for which said cheaters detection module yields a difference between said congestion marked packets and said congestion response packets that exceeds a predefined threshold.

13. The packet dropper according to claim 12, wherein said traffic analyzing modules include a drop behavior module configured to model drop probabilities based on predefined criteria.

14. The method according to claim 5, wherein a third step of said subsequent steps of said series of traffic analyzing steps includes imposing drop operations on those flows for which said second step analysis yields a difference between said congestion marked packets and said congestion response packets that exceeds a predefined threshold.

15. The method according to claim 6, wherein a third step of said subsequent steps of said series of traffic analyzing steps includes imposing drop operations on those flows for which said second step analysis yields a difference between said congestion marked packets and said congestion response packets that exceeds a predefined threshold.

* * * * *